Patented June 13, 1939

2,161,967

UNITED STATES PATENT OFFICE 2,161,967

DYESTUFFS OF THE ANTHRAQUINONE SERIES

Ralph N. Lulek, Silverside Heights, Del., and Clarence F. Belcher, Bridgeton, N. J., assignors to E. I. du Pont de Nemours & Company, Wilmington, Del., a corporation of Delaware No Drawing. Application October 21, 1938, Serial No. 236,304

4 Claims. (Cl. 260—316)

This invention relates to the preparation of new dyestuffs of the anthraquinone series, and more particularly to the preparation of dyestuffs containing the benzobenzanthrone nucleus.

According to the present invention, benzobenzanthrone, which may be prepared according to the process of U. S. Patent 798,104 is halogenated to give the mono- or dihalogen benzobenzanthrone. These halogen compounds are then condensed with aminoanthraquinones or aminoanthrones, and the condensation products are in turn fused with caustic alkali to convert them to desirable dyestuffs which dye cotton from the usual alkaline hydrosulfite vats in shades ranging from gray to olive and blue, of good fastness to bleach, light and soaping.

The benzobenzanthrone employed in this process is obtained by the condensation of 1:2-benzanthraquinone and glycerine in sulfuric acid in the presence of iron as more particularly described in U. S. Patent 1,896,147 with or without the addition of boric acid. The resulting isomeric mixture may be used directly in the preparation of the dyestuffs of the present case, or the crude may be extracted with solvents such as toluene or solvent naphtha and the resulting benzobenzanthrones employed. In the preparation of the benzobenzanthrone from 1:2-benzanthraquinone by this process, three isomeric compounds are possible depending upon the position of the benzobenzanthrone from 1:2-ben- For the purpose of this application, it is believed that in the main the benzobenzanthrone prepared by this process has the formula:

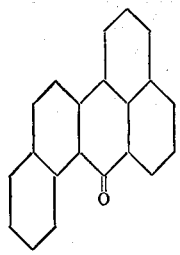

which on mono- and di- bromination may be considered as having the formula:

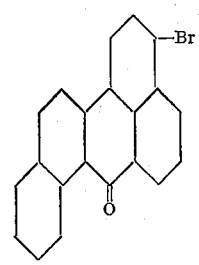 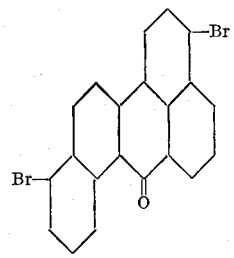

It is to be understood, however, that applicants do not limit the present invention to compounds having these particular formulas for they are entirely theoretical and have not been proven. On condensation with aminoanthraquinones or aminoanthrones the mono- and dibromobenzobenzanthrone give the corresponding mono- and di- condensation products, which on caustic alkali fusion give dyestuffs that dye in desirable shades of good fastness properties. In the alkali fusion of the di- condensation products it appears that both antharquinonyl radicals, which are attached to the dibromobenzobenzanthrone, are ring-closed to acridine groups, so that the formula above given is believed to be in all probability the formula for the benzobenzanthrone that is in the main produced by the process of U. S. Patent 798,104.

The following examples are given to illustrate the invention, in which the parts used are by weight.

EXAMPLE 1

*Preparation of bromobenbozenzanthrone*

48.3 parts of benzobenzanthraquinone, 0.5 parts of iodine and 146 parts of nitrobenzene are heated with agitation to 80 to 85° C. A mixture of 13.8 parts of bromine and 11.6 parts of sulfuryl chloride is then added over a period of 3 hours and the reaction mixture held on temperature for 8 additional hours. It is then diluted with 210 parts of alcohol, filtered, washed with alcohol and dried. The product is obtained in the form of yellow microscopic crystals.

EXAMPLE 2

10 parts of bromobenzobenzanthrone, prepared as in Example 1, 10.9 parts of 1-aminoanthraquinone, 10 parts of sodium carbonate and 1 part of cuprous chloride are suspended in 250 parts of nitrobenzene with stirring and heated 8 hours at the boil. The reaction mass is steam distilled and the product slurred in dilute hydrochloric acid to remove copper salts, filtered and dried. The product is a brown powder.

EXAMPLE 3

1 part of the condensate, prepared as in Example 2, is added gradually to a melt of 5 parts of caustic potash and 2.5 parts of methanol at 155 to 160° C. The temperature is raised to 160 to 165° C. and maintained for 3 hours. The reaction mass is diluted with water, heated and aerated, the precipitated dyestuff filtered off, washed and dried, or made into a paste. It dissolves in concentrated sulfuric acid with a bluish green color and dyes cotton greenish gray shades from a bluish violet vat.

EXAMPLE 4

10 parts of bromobenzobenzanthrone, prepared as in Example 1, 9.5 parts of 5-amino-2:1(N)-anthraquinonebenzacridone, 5 parts of sodium carbonate and 0.5 part of cuprous chloride are suspended in 150 parts of nitrobenzene with stirring and heated 8 hours at the boil. The reaction mass is steam distilled, slurried in dilute acid, filtered and dried. The product is a dark powder.

Example 5

1 part of the condensate, prepared as in Example 4, is charged into a stirred melt of 5 parts of caustic potash and 2.5 parts of methanol at 145 to 150° C. The temperature is raised to 150 to 160° C. and held for 3½ hours. The fusion mass is worked up in the usual manner, as described in Example 3. The resulting product is a dark powder that dissolves in concentrated sulfuric acid with a brown color and dyes cotton bluish gray shades from a violet vat.

Example 6

10 parts of bromobenzobenzanthrone, prepared as in Example 1, 9.5 parts of 8-amino-2:1(N)-anthraquinonebenzacridone, 5 parts of sodium carbonate and 0.5 part of cuprous chloride are suspended in 150 parts of nitrobenzene with stirring and heated 8 hours at the boil. The reaction mass is steam distilled, slurried in dilute acid, filtered and dried. The product is a dark powder.

Example 7

1 part of the condensate, prepared as in Example 6, is charged into a stirred melt of 5 parts of caustic potash and 2.5 parts of methanol at 145 to 150° C. The temperature is raised to 150 to 155° C. and held for 3 hours. The fusion mass is worked up in the usual manner. The finished product is a dark powder that disolves in concentrated sulfuric acid with a brown color and dyes cotton bluish gray shades from a violet vat.

Example 8

13.4 parts of bromobenzobenzanthrone, prepared as in Example 1, 12.8 parts of 1-amino-5-benzoylamino-anthraquinone, 8 parts of sodium carbonate and 0.5 part of cuprous chloride are suspended in 200 parts of nitrobenzene with stirring and heated 8 hours at the boil. The reaction mass is steam distilled, filtered and dried.

Example 9

1 part of the condensate, prepared as in Example 8, is added to a stirred melt of 10 parts of caustic potash and 5 parts of methanol at 140 to 150° C. The temperature is held at 150 to 155° C. for 3 hours. The fusion mass is worked up in the usual way. The reaction product may be rebenzoylated according to known methods and yields a dyestuff which dyes cotton olive shades from a violet vat. It dissolves in concentrated sulfuric acid with a green color.

Example 10

12.5 parts of bromobenzobenzanthrone, prepared as in Example 1, 4.2 parts of 1:5-diamino-anthraquinone, 8 parts of sodium carbonate and 0.5 part of cuprous chloride are heated at the boil for 8 hours in 150 parts of nitrobenzene, with agitation. The reaction mass is steam distilled, filtered and dried.

Example 11

1 part of the condensate, prepared as in Example 10, is added to a stirred melt of 10 parts of caustic potash and 5 parts of methanol at 150 to 160° C. The temperature is raised to 160 to 165° C. and held for 3 hours. The fusion melt is worked up in the usual manner. The product is a dark powder that dissolves in concentrated sulfuric acid with a greenish color and dyes cotton greenish gray shades from a blue violet vat.

Example 12

12.5 parts of bromobenzobenzanthrone, prepared as in Example 1, 4.2 parts of 1:4-diaminoanthraquinone, 8 parts of sodium carbonate and 0.5 part of cuprous chloride are heated for 8 hours at the boil, with agitation, in 150 parts of nitrobenzene. The reaction mass is steam distilled, slurried in dilute acid, filtered and dried.

Example 13

1 part of the condensate, prepared as in Example 12, is added to a stirred melt of 5 parts of caustic potash and 2.5 parts of methanol at 155 to 160° C. The temperature is held at 160 to 165° C. for 3 hours. The reaction mass is worked up in the usual manner. The product, when dried, is a dark powder that dissolves in concentrated sulfuric acid with a green color and dyes cotton neutral gray shades from a blue vat.

Example 14

12 parts of bromobenzobenzanthrone, prepared as in Example 1, 10.5 parts of 1-amino-4-anilidoanthraquinone, 8 parts of sodium carbonate and 0.5 part of cuprous chloride are suspended in 200 parts of nitrobenzene and heated at the boil for 8 hours. The reaction mass is steam distilled, slurried in dilute acid, filtered and dried.

Example 15

1 part of the condensation product, prepared as in Example 14, is added with stirring to a melt prepared from 5 parts of caustic potash and 2.5 parts of methanol at 155 to 160° C. The temperature is then raised to 160 to 165° C. and held for 5 hours. The fusion mass is worked up in the usual manner. The dyestuff dissolves in concentrated sulfuric acid with a green color and dyes cotton olive gray shades from a blue violet vat.

Example 16

7.8 parts of pyrazolanthrone and 3 parts of finely divided potassium carbonate are stirred 2 hours at 195° C. in 190 parts of nitrobenzene. Then 12.7 parts of bromobenzobenzanthrone, prepared as in Example 1, are added and the mixture heated 8 hours at the boil. The reaction mass is steam distilled, filtered and when dry, represents a brown powder.

Example 17

1 part of the condensate, prepared as in Example 15, is added to a stirred melt of 10 parts of caustic potash and 10 parts of methanol and heated for 5 hours at 115 to 120° C. The fusion mass is worked up according to the customary procedure. The finished dyestuff dissolves in concentrated sulfuric acid with a brown color and dyes cotton greenish blue shades from a blue vat.

Example 18

*Preparation of dibromobenzobenzanthrone*

30 parts of benzobenzanthrone are suspended in 120 parts of nitrobenzene at 90° C. and at this temperature a mixture of 41 parts of bromine and 30 parts of nitrobenzene is dropped in. The temperature is maintained at 90 to 100° C. until evolution of HBr has practically ceased. The reaction mixture is diluted with 200 parts of alcohol, and filtered when cool. The product is washed with alcohol, slurried in hot dilute sodium carbonate solution, washed and dried. The yellow product dissolves in concentrated sulfuric acid with a bluish red color.

Example 19

8 parts of dibromobenzobenzanthrone, prepared as in Example 18, 8 parts of 1-aminoanthraquinone, 8 parts of anhydrous potassium acetate and 0.2 parts of copper acetate are suspended in 160 parts of nitrobenzene with stirring and heated 6 hours at the boil. The reaction mass is cooled to 80 to 100° C. and the dark red product filtered, washed with nitrobenzene, alcohol, water and finally dried. The product represents a dark red to black powder and dissolves in concentrated sulfuric acid with a blackish green color.

Example 20

10 parts of the condensate, prepared as in Example 19, is added gradually to a stirred melt prepared from 100 parts of caustic potash and 80 parts of alcohol at 130 to 140° C. The temperature is raised to 155 to 160° C. and maintained 1 hour. The fusion mass is worked up in the usual manner. The product dissolves in concentrated sulfuric acid with a bluish green color and dyes cotton, from a turbid reddish violet vat, in neutral gray shades of very good fastness to light and soaping.

Example 21

8.4 parts of dibromobenzobenzanthrone, prepared as in Example 18, 9.4 parts of 1-amino-5-benzoylaminoanthraquinone, 6 parts of anhydrous potassium carbonate and 0.2 parts of cuprous chloride are suspended in 120 parts of nitrobenzene and while stirring the whole is heated to 200 to 207° C. for 15 hours. The temperature is allowed to drop to about 150° C. and the mix is diluted with 120 parts of solvent naphtha and stirred until cool. The blackish product is filtered off, washed with solvent naphtha, alcohol, water and then dried.

Example 22

10 parts of the condensate, prepared as in Example 21, are charged to a stirred melt of 100 parts of caustic potash and 100 parts of alcohol at 130 to 140° C. The temperature is raised to 155 to 160° C. and held 2 hours. The reaction mass is worked up in the usual manner. The dried fusion product, when rebenzoylated in nitrobenzene according to known methods, yields a dyestuff dyeing cotton in brown shades from a reddish gray vat. It dissolves in concentrated sulfuric acid with a gray green color.

Example 23

8 parts of dibromobenzobenzanthrone, prepared as in Example 18, 8 parts of potassium carbonate, 12 parts of 5-amino-2:1(N)anthraquinonebenzacridone, and 0.2 part of cuprous chloride are heated with agitation at 200 to 207° C. for 15 hours in 160 parts of nitrobenzene. The temperature is decreased to about 150° C. and the reaction mix diluted with solvent naphtha and stirred until cool. The charge is filtered, the residue washed with solvent naphtha, alcohol, dilute hydrochloric acid, water, and dried.

Example 24

15 parts of the condensate, prepared as in Example 23, are added to a melt of 120 parts of caustic potash and 60 parts of alcohol at 150 to 160° C. and the temperature is then raised to 170 to 180° C. and maintained for 1 hour. The fusion product is worked up as usual. It is a dark powder which dissolves in concentrated sulfuric acid to a reddish brown solution and dyes cotton bluish gray shades from a violet vat.

Example 25

10 parts of dibromobenzobenzanthrone, prepared as in Example 18, 11.5 parts of 1-amino-5-methylaminoanthraquinone, 10 parts of potassium carbonate, and 0.2 part of cuprous chloride are suspended in 200 parts of nitrobenzene and heated at 200 to 207° C. for 15 hours with agitation. The temperature is decreased to about 140° C., the reaction mixture diluted with 160 parts of solvent naphtha, and stirred until cool. The product is filtered, washed with solvent naphtha, alcohol, dilute hydrochloric acid, water and then dried.

Example 26

The condensate, prepared as in Example 25, is treated with caustic potash and methanol according to the method of Example 24. The product gives a blackish solution in concentrated sulfuric acid and dyes cotton neutral gray shades from a brown vat.

Example 27

8.1 parts of dibromobenzobenzanthrone, prepared as in Example 18, 13.5 parts of 1-amino-5-naphthylaminoanthraquinone, 8 parts of potassium carbonate, and 0.2 part of cuprous chloride are suspended in 135 parts of nitrobenzene and heated at 200 to 207° C. for 18 hours with agitation. The temperature is decreased to about 140° C., the charge diluted with 135 parts of solvent naphtha and stirred until cool. The product is filtered, washed with solvent naphtha, alcohol, dilute hydrochloric acid, water and then dried.

Example 28

15 parts of the condensate, prepared as in Example 27, are added to a melt of 112 parts of caustic potash and 90 parts of alcohol at 130 to 140° C. The temperature is raised to 175 to 185° C. and held 1 hour. The fusion mass is worked up in the usual manner. The dark-colored product gives a grayish brown color in concentrated sulfuric acid and dyes cotton in neutral gray shades from a brownish gray vat.

It is of course understood that other methods may be employed in effecting the bromination of the benzobenzanthrone, (see, for instance, German Patent 497,715) without departing from the spirit of this invention.

Other aminoanthraquinone compounds or aminoanthrone compounds may be substituted for those specifically mentioned above, the above examples being given to illustrate, and are not intended as limitations upon the scope of applicants' invention.

We claim:
1. The dyestuffs obtained by the condensation of a compound of the class consisting of aminoanthraquinones and aminoanthrones with a halogen benzobenzanthrone and subsequent caustic alkali fusion of the anthrimide compound so produced.
2. The dyestuffs obtained by the condensation of an aminoanthraquinone with a halogen benzobenzanthrone and subsequent caustic alkali fusion of the anthrimide compound so produced.

3. The dyestuff obtained by the condensation of an alphaaminoanthraquinone with a halogen benzobenzanthrone and subsequent caustic alkali fusion of the anthrimide compound so produced.

4. The dyestuff obtained by the condensation of 1-aminoanthraquinone with a halogen benzobenzanthrone and subsequent caustic alkali fusion of the anthrimide compound so produced.

RALPH N. LULEK.
CLARENCE F. BELCHER.

CERTIFICATE OF CORRECTION.

Patent No. 2,161,967. June 13, 1939.

RALPH N. LULEK, ET AL.

It is hereby certified that error appears in the printed specification of the above numbered patent requiring correction as follows: Page 1, first column, lines 30 and 31, strike out the words and syllable "position of the benzobenzanthrone from 1:2-ben-" and insert instead positions in which the glycerine group is condensed.; same page, second column, line 10, for "antharquinonyl" read anthraquinonyl; page 2, first column, line 36, Example 7, after the word "up" insert in; and that the said Letters Patent should be read with this correction therein that the same may conform to the record of the case in the Patent Office.

Signed and sealed this 18th day of July, A. D. 1939.

(Seal)

Henry Van Arsdale,
Acting Commissioner of Patents.